(12) United States Patent
Fu et al.

(10) Patent No.: US 11,972,596 B2
(45) Date of Patent: Apr. 30, 2024

(54) INTELLIGENT SMOG-PENETRATING OPTICAL IMAGING DETECTION DEVICE AND USE METHOD THEREOF

(71) Applicant: Changchun University of Science and Technology, Changchun (CN)

(72) Inventors: Qiang Fu, Changchun (CN); Meng Zhang, Changchun (CN); Yingchao Li, Changchun (CN); Yong Zhu, Changchun (CN); Haodong Shi, Changchun (CN); Shuai Yang, Changchun (CN); Zhuang Liu, Changchun (CN); Chao Wang, Changchun (CN)

(73) Assignee: Changchun University of Science and Technology, Changchun (CN)

( * ) Notice: Subject to any disclaimer, the term of this patent is extended or adjusted under 35 U.S.C. 154(b) by 79 days.

(21) Appl. No.: 17/822,423

(22) Filed: Aug. 25, 2022

(65) Prior Publication Data
US 2023/0274521 A1    Aug. 31, 2023

(30) Foreign Application Priority Data

Aug. 27, 2021  (CN) .......................... 202110991967.0

(51) Int. Cl.
*G06V 10/143* (2022.01)
*G02B 5/30* (2006.01)
(Continued)

(52) U.S. Cl.
CPC .......... *G06V 10/143* (2022.01); *G06V 20/194* (2022.01); *H04N 23/11* (2023.01); *H04N 23/90* (2023.01); *G02B 5/3016* (2013.01)

(58) Field of Classification Search
CPC .... G06V 10/143; G06V 20/194; H04N 23/11; H04N 23/90; H04N 23/45; G02B 5/3016;
(Continued)

(56) References Cited

U.S. PATENT DOCUMENTS

| | | | | |
|---|---|---|---|---|
| 5,473,368 A | * | 12/1995 | Hart ........................ | G09F 19/08 348/169 |
| 8,508,376 B2 | * | 8/2013 | Knox ...................... | G01N 21/17 340/630 |

(Continued)

*Primary Examiner* — Chiawei Chen
(74) *Attorney, Agent, or Firm* — Jordan IP Law, LLC; Todd A. Vaughn

(57) ABSTRACT

An intelligent smog-penetrating optical imaging detection device and a method of thereof, and belongs to the technical field of photoelectric imaging. The intensity information, the spectrum information, and the polarization information of light are organically combined, the three functions of intensity imaging, spectrum imaging and polarization imaging can be achieved, traditional imaging detection is beneficially supplemented, smog can be penetrated, the image contrast of imaging is improved, and therefore the working distance is increased. The intensity information reflects the detection distance, the target shape, the target size and the like; the spectrum information reflects material components, surface morphology and the like of a space target; the polarization information reflects the material and roughness of the target and the contrast with the background; and the intensity, spectrum and polarization three-dimensional information is jointly applied, the image contrast can be increased by 2-3 times.

8 Claims, 1 Drawing Sheet

(51) Int. Cl.
*G06V 20/10* (2022.01)
*H04N 23/11* (2023.01)
*H04N 23/90* (2023.01)

(58) Field of Classification Search
CPC . Y02A 90/10; G01J 1/42; G01J 3/2823; G01J 4/00; G01J 5/10
See application file for complete search history.

(56) References Cited

U.S. PATENT DOCUMENTS

| | | | | |
|---|---|---|---|---|
| 8,514,392 | B1* | 8/2013 | Carrieri | G01J 3/447 |
| | | | | 356/322 |
| 8,736,777 | B2* | 5/2014 | Voigt | G02F 1/13471 |
| | | | | 359/256 |
| 10,788,716 | B2* | 9/2020 | Zhou | G02F 1/133788 |
| 2008/0297360 | A1* | 12/2008 | Knox | G08B 17/117 |
| | | | | 340/628 |
| 2011/0058167 | A1* | 3/2011 | Knox | G08B 17/125 |
| | | | | 356/338 |
| 2020/0041687 | A1* | 2/2020 | Elbel | G01V 8/20 |
| 2020/0096817 | A1* | 3/2020 | Richards | G02B 27/32 |

* cited by examiner

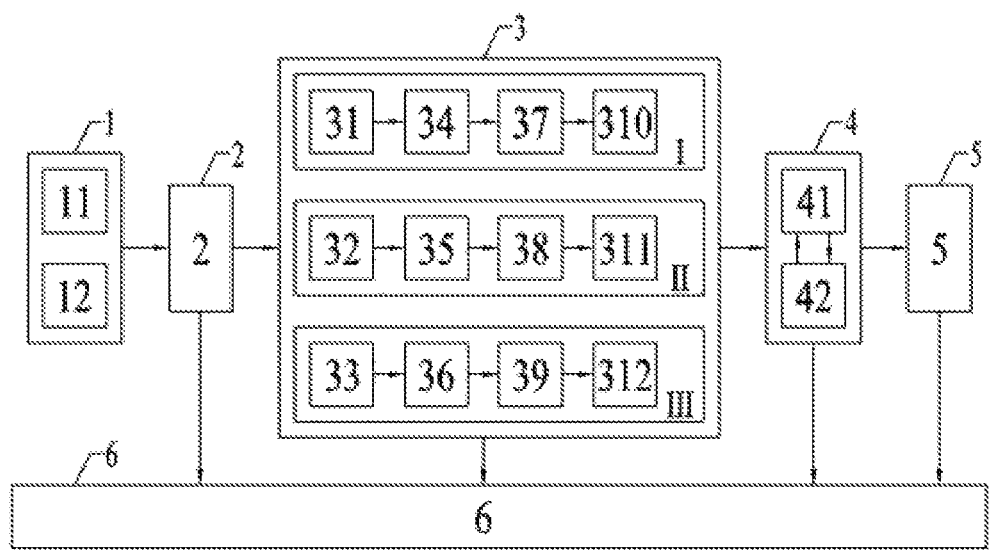

INTELLIGENT SMOG-PENETRATING OPTICAL IMAGING DETECTION DEVICE AND USE METHOD THEREOF

CROSS-REFERENCE TO RELATED APPLICATION

The present application claims priority under 35 U.S.C. § 119 to Chinese Patent Application No. 202110991967.0 (filed Aug. 27, 2021), which is hereby incorporated by reference in its complete entirety.

TECHNICAL FIELD

The present disclosure belongs to the technical field of photoelectric imaging, in particular to an intelligent smog-penetrating optical imaging detection device and a use method thereof.

BACKGROUND

Scene visibility is reduced due to a shielding effect on light in smog days, and highway traffic and civil aviation traffic are blocked, so that adverse effects are caused to national economy. Most of existing smog-penetrating imaging systems are intensity systems and infrared systems, but with the increasingly serious smog weather, the performance of the smog-penetrating imaging system with the adoption of the infrared technology only is limited. The multi-dimensional optical imaging technology and the artificial intelligence technology are combined in the present disclosure, so that an intelligent smog-penetrating optical imaging detection device and a use method thereof are proposed. Although preliminary research is carried out in two aspects of multi-dimensional detection and artificial intelligence detection in China, the device is mainly applied to the fields of meteorological detection, space environment, earth science and the like, and an intelligent smog-penetrating optical imaging detection device and a use method thereof are not developed yet. Therefore, a novel technical scheme is urgently needed in the prior art to solve the problem.

SUMMARY

The technical problem to be solved by the present disclosure is to provide an intelligent smog-penetrating optical imaging detection device and a use method thereof. The intensity information, the spectrum information and the polarization information of light are organically combined, the three functions of intensity imaging, spectrum imaging and polarization imaging can be achieved, traditional imaging detection is beneficially supplemented, smog can be penetrated, the image contrast of imaging is improved, and therefore the working distance is increased.

In order to achieve the purpose, the specific technical schemes of the intelligent smog-penetrating optical imaging detection device and the use method thereof in the present disclosure are as follows.

The intelligent smog-penetrating optical imaging detection device comprises a tracking rotary table subsystem, wherein the tracking rotary table subsystem is provided with an environmental measurement subsystem, an information processing subsystem, a visible and infrared imaging subsystem, an image processing subsystem and an image display subsystem; the environmental measurement subsystem completes detection of environmental visibility and illumination; the information processing subsystem completes processing of the environmental information and selection of an imaging unit; the visible and infrared imaging subsystem adjusts a two-dimensional tracking rotary table according to selection of the information processing subsystem to complete imaging of an object; the image processing subsystem processes images of the visible and infrared imaging subsystem according to selection of the information processing subsystem, and transmits the images to the image display subsystem to display the images;

the environmental measurement subsystem, the information processing subsystem, the visible and infrared imaging subsystem, the image processing subsystem and the image display subsystem are electrically connected in sequence; the visible and infrared imaging subsystem, the image processing subsystem and the image display subsystem are electrically connected with the tracking rotary table subsystem respectively;

the visible and infrared imaging subsystem comprises a visible light imaging unit I, a near-infrared imaging unit II and a long-wave infrared imaging unit III; optical axes of the visible light imaging unit I, the near-infrared imaging unit II and the long-wave infrared imaging unit III are parallel and are arranged in parallel;

the information processing subsystem performs analysis according to data measured by the environmental measurement subsystem, selects one of three units of the visible and infrared imaging subsystem, and controls the two-dimensional tracking rotary table to align the selected imaging unit with the object;

the image processing subsystem comprises an image enhancement processing unit and a polarization image processing unit; and image information obtained by the visible light imaging unit I, the near-infrared imaging unit II and the long-wave infrared imaging unit III is subjected to image processing by the image processing subsystem, and images subjected to information processing are transmitted to the image display subsystem.

Further, the visible light imaging unit I comprises a visible light filter, a liquid crystal phase retarder I, a liquid crystal phase retarder II and a visible camera, the visible light filter, the liquid crystal phase retarder I, the liquid crystal phase retarder II and the visible camera are arranged on the same optical axis and are connected in series, and after light sequentially passes through the visible light filter, the liquid crystal phase retarder I, the liquid crystal phase retarder II and the visible camera, visible light intensity imaging and visible light polarization imaging are completed on the visible light imaging unit I.

Further, the near-infrared imaging unit II comprises a near-infrared light filter, a liquid crystal phase retarder III, a liquid crystal phase retarder IV and a near-infrared camera, the near-infrared light filter, the liquid crystal phase retarder III, the liquid crystal phase retarder IV and the near-infrared camera are arranged on the same optical axis and are connected in series, and after light sequentially passes through the near-infrared light filter, the liquid crystal phase retarder III, the liquid crystal phase retarder IV and the near-infrared camera, near-infrared light intensity imaging and near-infrared light polarization imaging are completed on the near-infrared light imaging unit II.

Further, the long-wave infrared imaging unit III comprises a long-wave infrared light filter, a liquid crystal phase retarder V, a liquid crystal phase retarder VI and a long-wave infrared camera, the long-wave infrared light filter, the liquid crystal phase retarder V, the liquid crystal phase retarder VI and the long-wave infrared camera are arranged on the same optical axis and are connected in series, and after light sequentially passes through the long-wave infrared light filter, the liquid crystal phase retarder V, the liquid crystal phase retarder VI and the long-wave infrared camera, long-wave infrared light intensity imaging and long-wave infrared light polarization imaging are completed on the long-wave infrared light imaging unit III.

Further, the environmental measurement subsystem comprises a visibility meter and a photosensitive sensor, and is used for measuring environmental parameters and transmitting data to the information processing subsystem.

A use method of the intelligent smog-penetrating optical imaging detection device comprises the following steps in sequence:

step one, completing the construction of the intelligent smog-penetrating optical imaging detection device;

step two, measuring environmental parameters by a visibility meter and a photosensitive sensor in an environmental measurement subsystem and transmitting the measured environmental parameters to an information processing subsystem;

step three, processing environmental information by the information processing subsystem, and selecting a visible and infrared imaging subsystem by controlling a tracking rotary table subsystem;

step four, selecting a visible light imaging unit, a near-infrared imaging unit or a long-wave infrared imaging unit by the tracking rotary table subsystem;

step five, processing obtained images in an image processing subsystem; transmitting 0-degree, 45-degree, 90-degree and 135-degree linear polarization and circular polarization images into a polarization image processing unit to obtain polarization images; through the selection result of the information processing subsystem, selecting whether image enhancement is carried out or not on the polarization images or intensity images, transmitting the intensity images into an image enhancement processing unit to obtain image enhanced intensity images; and through the selection result of the information processing subsystem, selecting whether polarization image processing or image enhancement processing is carried out, and transmitting the processed images to an image display subsystem;

step six, displaying the final images in the image display subsystem; and step seven, when the environmental parameters are changed, repeating the second step to the sixth step.

Further, when the visible light imaging unit is selected, laser passes through a visible light filter, a liquid crystal phase retarder I, a liquid crystal phase retarder II and a visible camera at a time, and the intensity images and the 0-degree, 45-degree, 90-degree and 135-degree linear polarization and circular polarization images can be obtained by adjusting the liquid crystal phase retarder I and the liquid crystal phase retarder II, the information processing subsystem selects the intensity images or the polarization images and transmits the intensity images or the polarization images to the image processing subsystem.

Further, when the near-infrared imaging unit is selected, laser passes through a near-infrared filter, a liquid crystal phase retarder III, a liquid crystal phase retarder IV and a near-infrared camera at a time, and the intensity images and the 0-degree, 45-degree, 90-degree and 135-degree linear polarization and circular polarization images can be obtained by adjusting the liquid crystal phase retarder III and the liquid crystal phase retarder IV, the information processing subsystem selects the intensity images or the polarization images and transmits the intensity images or the polarization images to the image processing subsystem.

Further, when the long-wave infrared imaging unit is selected, laser passes through a long-wave infrared filter, a liquid crystal phase retarder V, a liquid crystal phase retarder VI and a long-wave infrared camera at a time, and the intensity images and the 0-degree, 45-degree, 90-degree and 135-degree linear polarization and circular polarization images can be obtained by adjusting the liquid crystal phase retarder V and the liquid crystal phase retarder VI, the information processing subsystem selects the intensity images or the polarization images and transmits the intensity images or the polarization images to the image processing subsystem.

Step four, selecting a visible light imaging unit, a near-infrared imaging unit or a long-wave infrared imaging unit by the two-dimensional tracking rotary table.

When the visible light imaging unit is selected, laser passes through a visible light filter, a liquid crystal phase retarder I, a liquid crystal phase retarder II and a visible camera at a time. The intensity images and the 0-degree, 45-degree, 90-degree and 135-degree linear polarization and circular polarization images can be obtained by adjusting the liquid crystal phase retarders, the information processing subsystem selects the intensity images or the polarization images and transmits the intensity images or the polarization images to the image processing subsystem.

When the near-infrared imaging unit is selected, laser passes through a near-infrared filter, a liquid crystal phase retarder III, a liquid crystal phase retarder IV and a near-infrared camera at a time. The intensity images and the 0-degree, 45-degree, 90-degree and 135-degree linear polarization and circular polarization images can be obtained by adjusting the liquid crystal phase retarders, the information processing subsystem selects the intensity images or the polarization images and transmits the intensity images or the polarization images to the image processing subsystem.

When the long-wave infrared imaging unit is selected, laser passes through a long-wave infrared filter, a liquid crystal phase retarder V, a liquid crystal phase retarder VI and a long-wave infrared camera at a time. The intensity images and the 0-degree, 45-degree, 90-degree and 135-degree linear polarization and circular polarization images can be obtained by adjusting the liquid crystal phase retarders, the information processing subsystem selects the intensity images or the polarization images and transmits the intensity images or the polarization images to the image processing subsystem.

Step five, processing obtained images in an image processing subsystem, and transmitting 0-degree, 45-degree, 90-degree and 135-degree linear polarization and circular polarization images into a polarization image processing unit to obtain polarization images; and through the selection result of the information processing subsystem, selecting whether image enhancement is carried out or not on the polarization images or intensity images, and transmitting the processed images to an image display subsystem.

Step six, displaying the final images in the image display subsystem.

Step seven, when the environmental parameters are changed, repeating the second step to the sixth step.

The intelligent smog-penetrating optical imaging detection device and the use method thereof have the advantages that according to the intelligent smog-penetrating optical imaging detection device and the use method thereof, the intensity information, the spectrum information and the polarization information of light are organically combined, the three functions of intensity imaging, spectrum imaging and polarization imaging can be achieved, traditional imaging detection is beneficially supplemented, smog can be penetrated, the image contrast of imaging is improved, and therefore the working distance is increased. The intensity information reflects the detection distance, the target shape, the target size and the like; the spectrum information reflects material components, surface morphology and the like of a space target; the polarization information reflects the material and roughness of the target and the contrast with the background; and the intensity, spectrum and polarization three-dimensional information is jointly applied, the image contrast can be increased by 2-3 times, and therefore the working distance is increased by 30%, the target detection probability is improved, and smog-penetrating imaging is achieved more effectively.

BRIEF DESCRIPTION OF THE DRAWINGS

FIG. 1 is a structural schematic diagram of an intelligent smog-penetrating optical imaging detection device in the present disclosure.

Reference signs in the attached figures: 1, environmental measurement subsystem; 11, visibility meter; 12, photosensitive sensor; 2, information processing subsystem; 3, visible and infrared imaging subsystem; 31, visible light filter; 32, near-infrared light filter; 33, long-wave infrared light filter; 34, liquid crystal phase retarder I; 35, liquid crystal phase retarder III; 36, liquid crystal phase retarder V; 37, liquid crystal phase retarder II; 38, liquid crystal phase retarder IV; 39, liquid crystal phase retarder VI; 310, visible camera; 311, near-infrared camera; 312, long-wave infrared camera; 4, image processing subsystem; 41, image enhancement processing unit; 42, polarization image processing unit; 5, image display subsystem; and 6, tracking rotary table subsystem.

DETAILED DESCRIPTION OF THE EMBODIMENTS

In order to better understand the purpose, the structure and the function of the present disclosure, the intelligent smog-penetrating optical imaging detection device and the use method thereof are further described in detail in combination with the attached figures.

As shown in FIG. 1, according to the intelligent smog-penetrating optical imaging detection device and the use method thereof, the device comprises an environmental measurement subsystem 1, an information processing subsystem 2, a visible and infrared imaging subsystem 3, an image processing subsystem 4, an image display subsystem 5 and a tracking rotary table subsystem 6, wherein the visible and infrared imaging subsystem 3, the image processing subsystem 4 and the image display subsystem 5 are jointly placed on the tracking rotary table subsystem 6; the environmental measurement subsystem 1, the information processing subsystem 2, the visible and infrared imaging subsystem 3, the image processing subsystem 4 and the image display subsystem 5 are electrically connected in sequence; the visible and infrared imaging subsystem 3, the image processing subsystem 4 and the image display subsystem 5 are electrically connected with the tracking rotary table subsystem 6 respectively.

The environmental measurement subsystem 1 comprises an SWS-100 model visibility meter 11 of Shanghai LABSUN and an RPM-075PTT86 photosensitive sensor 12 of Shenzhen Haihong Microelectronic Limited Company.

The environmental parameters are measured and transmitted to the information processing subsystem 2.

The information processing subsystem 2 performs analysis according to data measured by the environmental measurement subsystem 1, selects one of three units of the visible and infrared imaging subsystem 3, and controls the two-dimensional tracking rotary table to align the selected imaging unit with the object.

The visible and infrared imaging subsystem 3 comprises a visible light imaging unit I, a near-infrared imaging unit II and a long-wave infrared imaging unit III. The visible light imaging unit I comprises an FEL0400 model visible light filter 31 of American Thorlabs Company, a KURIOS-WL1 model liquid crystal phase retarder 34 of American Thorlabs Company, a KURIOS-WL1 model liquid crystal phase retarder 37 of American Thorlabs Company and a Phoenix model visible camera 310 of Canadian LUCCID, and the FEL0400 model visible light filter 31 of American Thorlabs Company, the KURIOS-WL1 model liquid crystal phase retarder 34 of American Thorlabs Company, the KURIOS-WL1 model liquid crystal phase retarder 37 of American Thorlabs Company and the Phoenix model visible camera 310 of Canadian LUCCID are arranged on the same optical axis and are connected in series; after light sequentially passes through the visible light filter 31, the liquid crystal phase retarder 34, the liquid crystal phase retarder 37 and the visible camera 310, visible light intensity imaging and visible light polarization imaging are completed on the visible light imaging unit I; the near-infrared imaging unit II comprises an FEL1050 model near-infrared light filter 32 of American Thorlabs Company, a KURIOS-WL1 model liquid crystal phase retarder 35 of American Thorlabs Company, a KURIOS-WL1 model liquid crystal phase retarder 38 of American Thorlabs Company and a Pure series near-infrared camera 311 of Dualix spectral imaging Company, and the FEL1050 model near-infrared light filter 32 of American Thorlabs Company, the KURIOS-WL1 model liquid crystal phase retarder 35 of American Thorlabs Company, the KURIOS-WL1 model liquid crystal phase retarder 38 of American Thorlabs Company and the Pure series near-infrared camera 311 of Dualix spectral imaging Company are arranged on the same optical axis and are connected in series; after light sequentially passes through the near-infrared light filter 32, the liquid crystal phase retarder 35, the liquid crystal phase retarder 38 and the near-infrared camera 311, near-infrared light intensity imaging and near-infrared light polarization imaging are completed on the near-infrared light imaging unit II; the long-wave infrared imaging unit III comprises an FB1750-500 model long-wave infrared light filter 33 of American Thorlabs Company, a KURIOS-WL1 model liquid crystal phase retarder 36 of American Thorlabs Company, a KURIOS-WL1 model liquid crystal phase retarder 39 of American Thorlabs Company and an A8580SLS model long-wave infrared camera 312 of American Teledyne FLIR Company, and the FB1750-500 model long-wave infrared light filter 33 of American Thorlabs Company, the KURIOS-WL1 model liquid crystal phase retarder 36 of American Thorlabs Company, the KURIOS-WL1 model liquid crystal phase retarder 39 of American Thorlabs Company and the A8580SLS model long-wave infrared camera 312 of American Teledyne FLIR Company are arranged on the same optical axis and are connected in series; after light sequentially passes through the long-wave infrared light filter 33, the liquid crystal phase retarder 36, the liquid crystal phase retarder 39 and the long-wave infrared camera 312, long-wave infrared light intensity imaging and long-wave infrared light polarization imaging are completed on the long-wave infrared light imaging unit III; optical axes of the visible light imaging unit I, the near-infrared imaging unit II and the long-wave infrared imaging unit III are parallel and are arranged in parallel;

the image processing subsystem 4 comprises an image enhancement processing unit 41 and a polarization image processing unit 42; and image information obtained by the visible light imaging unit I, the near-infrared imaging unit II and the long-wave infrared imaging unit III is subjected to image processing by the image processing subsystem 4, and images subjected to information processing are transmitted to the image display subsystem 5.

The image display subsystem 5 is used for displaying the obtained images through final processing.

According to a use method of the intelligent smog-penetrating optical imaging detection device, the intelligent smog-penetrating optical imaging detection device is tested with the method, specifically comprising the following steps.

Step one, constructing the device according to the intelligent smog-penetrating optical imaging detection device.

Step two, measuring environmental parameters by a visibility meter 11 and a photosensitive sensor 12 in an environmental measurement subsystem 1 and transmitting the measured environmental parameters to an information processing subsystem 2.

Step three, processing environmental information by the information processing subsystem 2, and selecting the visible and infrared imaging subsystem 3 by controlling the tracking rotary table subsystem 6, specifically as shown in Table I as follows:

TABLE I selection of the information processing subsystem on wavebands, the polarization image processing unit and the image enhancement processing unit

| Visibility | Photo-sensitive sensor | Wavebands | Polarization | Image enhancement |
|---|---|---|---|---|
| 25-30 km | Yes | Visible light | No | No |
| 20-25 km | Yes | Visible light | No | Yes |
| 15-20 km | Yes | Visible light | Yes | No |
| 10-15 km | Yes | Visible light | Yes | Yes |
| 1-10 km | Yes | Near-infrared light | No | No |
| 0.3-1 km | Yes | Near-infrared light | No | Yes |
| 0.1-0.3 km | Yes | Near-infrared light | Yes | No |
| Smaller than 0.1 km | Yes | Near-infrared light | Yes | Yes |
| 15-30 km | No | Long-wave infrared light | No | No |
| 1-15 km | No | Long-wave infrared light | No | Yes |
| 0.3-1 km | No | Long-wave infrared light | Yes | No |
| Smaller than 0.3 km | No | Long-wave infrared light | Yes | Yes |

Step four, selecting a visible light imaging unit I, a near-infrared imaging unit II or a long-wave infrared imaging unit III by the tracking rotary table subsystem 6.

Firstly, when the visible light imaging unit I is selected, laser passes through a visible light filter 31, a liquid crystal phase retarder I 34, a liquid crystal phase retarder II 37 and a visible camera 310 at a time. The intensity images and the 0-degree, 45-degree, 90-degree and 135-degree linear polarization and circular polarization images can be obtained by adjusting the liquid crystal phase retarder I 34 and the liquid crystal phase retarder II 37, the information processing subsystem 2 selects the intensity images or the polarization images and transmits the intensity images or the polarization images to the image processing subsystem 4.

Secondly, when the near-infrared imaging unit II is selected, laser passes through a near-infrared filter 32, a liquid crystal phase retarder III 35, a liquid crystal phase retarder IV 38 and a near-infrared camera 311 at a time. The intensity images and the 0-degree, 45-degree, 90-degree and 135-degree linear polarization and circular polarization images can be obtained by adjusting the liquid crystal phase retarder III 35 and the liquid crystal phase retarder IV 38, the information processing subsystem 2 selects the intensity images or the polarization images and transmits the intensity images or the polarization images to the image processing subsystem 4.

Thirdly, when the long-wave infrared imaging unit III is selected, laser passes through a long-wave infrared filter 33, a liquid crystal phase retarder V 36, a liquid crystal phase retarder VI 39 and a long-wave infrared camera 312 at a time. The intensity images and the 0-degree, 45-degree, 90-degree and 135-degree linear polarization and circular polarization images can be obtained by adjusting the liquid crystal phase retarder V 36 and the liquid crystal phase retarder VI 39, the information processing subsystem 2 selects the intensity images or the polarization images and transmits the intensity images or the polarization images to the image processing subsystem 4.

Step five, processing obtained images in an image processing subsystem 4, transmitting 0-degree, 45-degree, 90-degree and 135-degree linear polarization and circular polarization images into a polarization image processing unit 42 to obtain polarization images, and transmitting intensity images into an image enhancement processing unit 41 to obtain image enhanced intensity images. Through the selection result of the information processing subsystem 2, selecting whether polarization image processing or image enhancement processing is carried out, and transmitting the processed images to an image display subsystem. For example, when the visibility is 15-20 km and the photosensitive sensor displays light, the polarization images imaged by the visible light imaging unit are processed by the polarization image processing unit 42 to obtain the images, the image enhancement processing unit 41 is not needed, and details are shown in table I.

Step six, displaying the final images in the image display subsystem 5.

Step seven, when the environmental parameters are changed, repeating the second step to the sixth step.

It is understandable that the present disclosure has been described by means of some embodiments. It will be apparent to those skilled in the art that various changes or equivalent substitutions may be made to these characteristics and embodiments without departing from the spirit and scope of the present disclosure. In addition, the characteristics and embodiments may be modified to adapt specific situations and materials without departing from the spirit and scope of the present disclosure under the teaching of the present disclosure. Accordingly, the present disclosure is not to be limited by the specific embodiments disclosed herein, and all embodiments falling within the scope of the claims of the present disclosure are intended to be included in the present disclosure.

What is claimed is:

1. A method of using an intelligent smog-penetrating optical imaging detection device, the method comprising:

in sequence:
  completing, as a first step, a construction of the intelligent smog-penetrating optical imaging detection device, wherein the intelligent smog-penetrating optical imaging detection device comprises a two-dimensional tracking rotary table subsystem provided with an environmental measurement subsystem, an information processing subsystem, a visible and infrared imaging subsystem, an image processing subsystem, and an image display subsystem, wherein the visible and infrared imaging subsystem comprises a visible light imaging unit I, a near-infrared imaging unit II, and a long-wave infrared imaging unit III, wherein optical axes of the visible light imaging unit I, the near-infrared imaging unit II, and the long-wave infrared imaging unit III are parallel and are arranged in parallel, wherein the environmental measurement subsystem, the information processing subsystem, the visible and infrared imaging subsystem, the image processing subsystem, and the image display subsystem are electrically connected in sequence, wherein the visible and infrared imaging subsystem, the image processing subsystem, and the image display subsystem are electrically connected with the two-dimensional tracking rotary table subsystem respectively, and wherein the image processing subsystem comprises an image enhancement processing unit and a polarization image processing unit,
  measuring, as a second step, environmental parameters by a visibility meter and a photosensitive sensor in the environmental measurement subsystem, and transmitting the measured environmental parameters to the information processing subsystem,
  processing, as a third step, environmental information by the information processing subsystem, and selecting the visible and infrared imaging subsystem by controlling the two-dimensional tracking rotary table subsystem,
  selecting, as a fourth step, by the two-dimensional tracking rotary table subsystem, the visible light imaging unit, one of the near-infrared imaging units or one of the long-wave infrared imaging units,
  processing, as a fifth step, obtained images in the image processing subsystem, transmitting 0-degree, 45-degree, 90-degree, and 135-degree linear polarization and circular polarization images into a polarization image processing unit to obtain polarization images, and transmitting intensity images into the image enhancement processing unit to obtain image enhanced intensity images; through a selection result of the information processing subsystem, selecting whether polarization image processing or image enhancement processing is carried out, and transmitting the processed images to the image display subsystem,
  displaying, as a sixth step, final images in the image display subsystem,
  repeating, when the environmental parameters are changed, the second step to the sixth step;
wherein:
  the information processing subsystem performs analysis according to data measured by the environmental measurement subsystem, selects one of three units of the visible and infrared imaging subsystem, and controls the two-dimensional tracking rotary table to align the selected imaging unit with an object, and image information obtained by the visible light imaging unit I, the near-infrared imaging unit II, and the long-wave infrared imaging unit III is subjected to image processing by the image processing subsystem, and images subjected to information processing are transmitted to the image display subsystem.

2. The method of claim 1, wherein when the visible light imaging unit is selected:
  a laser passes through a visible light filter, a liquid crystal phase retarder I, a liquid crystal phase retarder II and a visible camera in sequence,
  intensity images and the 0-degree, 45-degree, 90-degree, and 135-degree linear polarization and circular polarization images are obtained by adjusting the liquid crystal phase retarder I and the liquid crystal phase retarder II, and
  the information processing subsystem selects the intensity images or the polarization images and transmits the intensity images or the polarization images to the image processing subsystem.

3. The method of claim 1, wherein when the near-infrared imaging unit is selected:
  a laser passes through a near-infrared filter, a liquid crystal phase retarder III, a liquid crystal phase retarder IV, and a near-infrared camera in sequence,
  intensity images and the 0-degree, 45-degree, 90-degree, and 135-degree linear polarization and circular polarization images are obtained by adjusting the liquid crystal phase retarder III and the liquid crystal phase retarder IV, and
  the information processing subsystem selects the intensity images or the polarization images and transmits the intensity images or the polarization images to the image processing subsystem.

4. The method of claim 1, wherein when the long-wave infrared imaging unit is selected:
  a laser passes through a long-wave infrared filter, a liquid crystal phase retarder V, a liquid crystal phase retarder VI, and a long-wave infrared camera in sequence,
  the intensity images and the 0-degree, 45-degree, 90-degree, and 135-degree linear polarization and circular polarization images can be obtained by adjusting the liquid crystal phase retarder V and the liquid crystal phase retarder VI, and
  the information processing subsystem selects the intensity images or the polarization images and transmits the intensity images or the polarization images to the image processing subsystem.

5. The method of claim 1, wherein:
the visible light imaging unit I comprises a visible light filter, a liquid crystal phase retarder I, a liquid crystal phase retarder II, and a visible camera,
the visible light filter, the liquid crystal phase retarder I, the liquid crystal phase retarder II, and the visible camera are arranged on the same optical axis and are connected in series, and
visible light intensity imaging and visible light polarization imaging are completed on the visible light imaging unit I after light sequentially passes through the visible light filter, the liquid crystal phase retarder I, the liquid crystal phase retarder II, and the visible camera.

6. The method of claim 1, wherein:
the near-infrared imaging unit II comprises a near-infrared light filter, a liquid crystal phase retarder III, a liquid crystal phase retarder IV, and a near-infrared camera, the near-infrared light filter, the liquid crystal phase retarder III, the liquid crystal phase retarder IV, and the near-infrared camera, are arranged on the same optical axis and are connected in series, and near-infrared light intensity imaging and near-infrared light polarization imaging are completed on the near-infrared light imaging unit II after light sequentially passes through the near-infrared light filter, the liquid crystal phase retarder III, the liquid crystal phase retarder IV, and the near-infrared camera.

7. The method of claim 2, wherein:

the long-wave infrared imaging unit III comprises a long-wave infrared light filter, a liquid crystal phase retarder V, a liquid crystal phase retarder VI, and a long-wave infrared camera, the long-wave infrared light filter, the liquid crystal phase retarder V, the liquid crystal phase retarder VI, and the long-wave infrared camera are arranged on the same optical axis and are connected in series, and long-wave infrared light intensity imaging and long-wave infrared light polarization imaging are completed on the long-wave infrared light imaging unit III after light sequentially passes through the long-wave infrared light filter, the liquid crystal phase retarder V, the liquid crystal phase retarder VI, and the long-wave infrared camera.

8. The method of claim 1, wherein the environmental measurement subsystem comprises a visibility meter and a photosensitive sensor, and is used for measuring environmental parameters and transmitting data to the information processing subsystem.

* * * * *